UNITED STATES PATENT OFFICE.

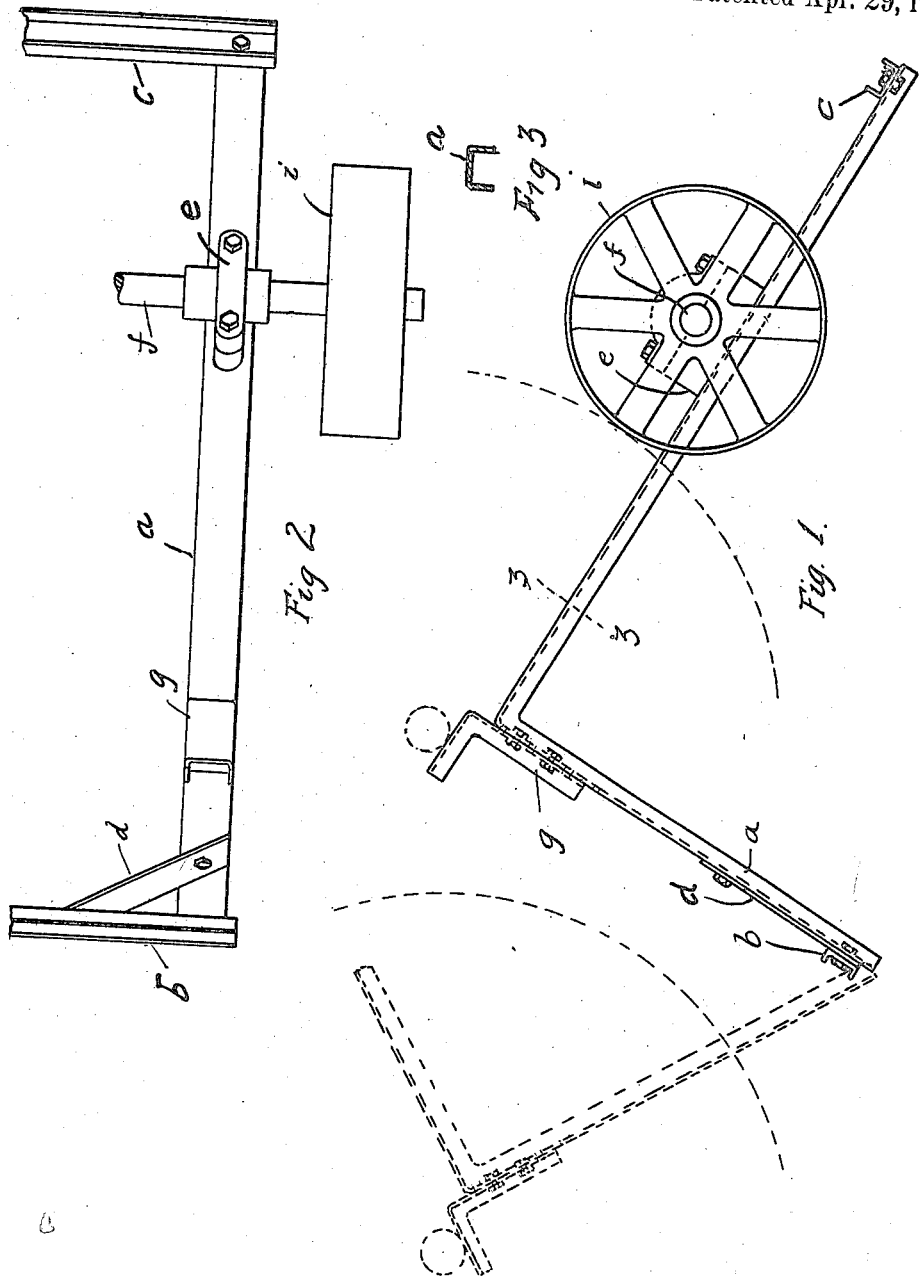

JOHN W. FITZGERALD, OF DETROIT, MICHIGAN, ASSIGNOR TO L. A. YOUNG INDUSTRIES, INC., OF DETROIT, MICHIGAN, A CORPORATION OF MICHIGAN.

POWER-TRANSMISSION DEVICE.

1,302,147.   Specification of Letters Patent.   Patented Apr. 29, 1919.

Application filed July 20, 1918. Serial No. 245,874.

*To all whom it may concern:*

Be it known that I, JOHN W. FITZGERALD, a citizen of the United States, residing at Detroit, county of Wayne, State of Michigan, have invented a new and useful Improvement in Power-Transmission Devices, of which the following is a specification.

This invention relates to combined jacks and power transmission devices for use in connection with automobiles to jack up the rear axle and utilize the tires for driving a pulley. Devices of this character are not broadly new but this invention is designed to accomplish this result in a more economical and facile way.

The appeal of apparatus of this character depends largely upon how cheap it can be made to sell. Also in these times of stress when steel for a general industry is hard to procure, a construction which effects a saving in steel achieves a very useful end.

Another feature of the invention is the adaptability of the jack to axles of varying height and even the simple arrangement for changing the position of the axle rest with respect to the frame.

In the drawings,—

Figure 1 is a side elevation.

Fig. 2 is a plan view, fragmentary in character.

Fig. 3 is a section on the line 3—3 of Fig. 1.

The frame comprises simply a pair of channel iron elbows $a$ connected at opposite ends by channel cross bars $b$ and $c$. Preferably these are braced at the corners by oblique angle iron braces $d$. The short arm of the elbow serves as a lifting arm of the jack or the resistance arm of the lever, while the long arm serves as the handle of the jack, and the long arm plus the short arm serves as the power arm of the lever. On the long arm of the lever or elbow is bolted the pulley journal $e$, which in connection with the pulley shaft $f$ and the journal on the opposite side also acts as a cross brace.

The axle rests are simply the short channel iron elbows $g$ that can be bolted to the short arm of the elbows of the frame adjacent the turn in the elbow. By making either one of these elbow members or both elbow members perforated in several places these elbow rests can be raised or lowered to meet the requirements of cars having different sized wheels.

The device can be operated in a simple way by placing it under a car, as shown in the dotted lines of Fig. 1 and then bearing down on the end of the long arm of the lever. This throws the axle and the load over the vertical line through the fulcrum point and the axle is free to shift on the axle rest until it bears against the pulleys $i$. It not only holds down the jack with the load upon it but it also adjusts the wheel to the pulley as the axle may slide on the rest to bring the tire into good driving contact with the pulley. This is quite an advantage with a device of this character as this object has had to be accomplished in most of the previous devices by making the journals of the pulley wheel adjustable along the frame or by providing springs to shove the pulley wheel into good driving contact with the tire.

By using this frame made up of the four elbows with remaining straight stock, not only is material saving in the steel effected but difficulty in manufacture is largely avoided as these elbows require no special bending machinery to bend them but may be easily bent by common apparatus for this purpose.

What I claim is:

1. In a combined jack and power transmission device, the combination of a pair of channel iron elbows forming short resistance arms of levers and long arms which are to operate as the handles of the lever, connecting bars for the elbows, and journals and pulleys on the long arms of the elbows, the said frame being formed by these members being arranged to support the axle of an automobile near the turn of the elbows, the said frame being insertible under an automobile axle to lift the same and throw the load over the vertical line passing through the center of the fulcrums which are the ends of the short arms of the elbows while the ends of the long arms of the elbows are brought against the ground and held there when the load passes over the vertical plane that passes through the fulcrums.

2. In a combined jack and power transmission device, a frame made up simply of a pair of elbows and cross connecting members, one arm of the elbow forming the handle for the frame and the other arm forming the load arm, journals near the operating ends of the elbows, and pulleys supported by the journals, the said elbows being provided with an axle rest near the turning of the elbows, the said frame being insertible under the axle of an automobile to get under the axle of the axle rest, the frame fulcruming on one end of the elbows and being pressed down by the other or operating end of the elbows, whereupon the load passing the vertical plane through the fulcrum points shifts the tires against the pulley wheels establishing a driving contact and also holds down both ends of the elbows.

3. In a combined jack and power transmission device, the combination of a frame made up simply of a pair of elbows and cross connecting members, journals near the operating ends of the elbows, a pulley shaft in said journals, and elbow axle rests boltable at the turning of the first-mentioned elbows at various points therealong to accord with axles of different heights, the said frame operating to fulcrum on the one end of the elbows to throw the axle and load over the vertical line passing through the center of the fulcrum and thereby shift it against the pulleys and at the same time hold the frame down.

In witness whereof I have hereunto set my hand on the 15th day of July, 1918.

JOHN W. FITZGERALD.

Copies of this patent may be obtained for five cents each, by addressing the "Commissioner of Patents, Washington, D. C."